(12) United States Patent
Worrell et al.

(10) Patent No.: US 7,887,088 B2
(45) Date of Patent: Feb. 15, 2011

(54) ACTUATOR FOR A HORN OF A VEHICLE

(75) Inventors: Barry C. Worrell, Centerville, OH (US); James J. Simpson, Dayton, OH (US)

(73) Assignee: Autoliv Development AB, Vargarda (SE)

( * ) Notice: Subject to any disclaimer, the term of this patent is extended or adjusted under 35 U.S.C. 154(b) by 227 days.

(21) Appl. No.: 12/339,816

(22) Filed: Dec. 19, 2008

(65) Prior Publication Data
US 2009/0315306 A1 Dec. 24, 2009

Related U.S. Application Data (60) Provisional application No. 61/015,520, filed on Dec. 20, 2007.

(51) Int. Cl.
*B60R 21/203* (2006.01)
*B60R 21/215* (2006.01)

(52) U.S. Cl. .................. 280/731; 280/728.3; 280/728.2; 200/61.54

(58) Field of Classification Search ... 200/61.54–61.56; 280/731, 728.2, 728.3, 728.1
See application file for complete search history.

(56) References Cited

U.S. PATENT DOCUMENTS

| | | | |
|---|---|---|---|
| 5,762,365 A | 6/1998 | Worrell et al. | |
| 6,053,526 A * | 4/2000 | Preisler et al. | 280/728.2 |
| 6,099,027 A * | 8/2000 | Shirk et al. | 280/728.3 |
| 6,135,546 A * | 10/2000 | Demtchouk | 297/135 |
| 6,485,403 B2 * | 11/2002 | Kamano et al. | 493/457 |
| 6,616,181 B1 * | 9/2003 | Ford | 280/731 |
| 7,159,897 B2 | 1/2007 | Worrell et al. | |
| 2002/0084634 A1 * | 7/2002 | Adomeit et al. | 280/731 |
| 2005/0184486 A1 * | 8/2005 | Schneider et al. | 280/728.2 |
| 2006/0125217 A1 * | 6/2006 | Nakamura et al. | 280/731 |
| 2007/0126216 A1 * | 6/2007 | Nakamura et al. | 280/731 |
| 2007/0158932 A1 * | 7/2007 | Taniyama et al. | 280/728.3 |
| 2009/0273165 A1 * | 11/2009 | Worrell et al. | 280/728.3 |

* cited by examiner

*Primary Examiner*—Ruth Ilan
(74) *Attorney, Agent, or Firm*—Harness, Dickey & Pierce, P.L.C.

(57) ABSTRACT

An actuator for a horn of a vehicle, comprising: an emblem; a bezel fixedly secured to a first side of a deployable portion of a cover of an airbag module, the bezel movably securing the emblem to the cover and the emblem being capable of movement between a first position and a second position with respect to the bezel, the second position causing activation of the horn; a backing plate secured to the bezel at a second side opposite the first side of the deployable portion; and a tether secured to the bezel, the tether retaining the actuator with the cover after deployment of the airbag module.

21 Claims, 8 Drawing Sheets

ACTUATOR FOR A HORN OF A VEHICLE

CROSS REFERENCE TO RELATED APPLICATIONS

This application claims the benefit of U.S. Provisional Patent Application No. 61/015,520, filed Dec. 20, 2007 the contents of which are incorporated herein by reference thereto.

BACKGROUND OF THE INVENTION

Exemplary embodiments of the present invention relate generally to horn devices for steering wheels and more specifically, exemplary embodiments of the present invention relate to an emblem horn switch integrated into a cover of a driver's airbag module.

Existing horn switches in automobiles can be positioned underneath the airbag module, such that the horn can be actuated by an operator pressing a cover of the airbag module for moving the airbag module against the horn switch. This packaging can have a significant gap between the airbag module and the steering wheel, as well as expensive horn mechanization. Other horn switches are provided by discrete buttons positioned outboard of the airbag module cover (e.g. on or near opposing spokes of the steering wheel).

Therefore, it is desirable to provide an actuator for a horn of a vehicle, such that the actuator can be readily accessed and operated. Additionally, it is desirable to provide a cover of an airbag module that is efficiently packaged within a steering wheel for reducing manufacturing costs. It is further desirable to provide a method for securing an emblem and a horn switch to a cover of an airbag module, such that the horn can be quickly activated and that the horn can have substantially low manufacturing costs.

SUMMARY OF THE INVENTION

An actuator for a horn of a vehicle in accordance with an exemplary embodiment is provided. The actuator includes an emblem. The actuator further includes a bezel fixedly secured to a deployable portion of a cover of an airbag module. The bezel movably secures the emblem to the cover such that the emblem is capable of movement between first and second positions with respect to the bezel. The emblem causes activation of the horn when the emblem is moved toward the second position.

A cover for an airbag module mounted to a steering wheel in accordance with another non-limiting exemplary embodiment is disclosed herein. The cover includes a decorative outer layer having a predetermined tear seam. The cover further includes a bezel fixedly secured to a deployable portion of the decorative outer layer. The bezel movably secures an emblem to the decorative outer layer, such that the emblem is capable of movement between first and second positions with respect to the bezel. The emblem causes activation of a horn switch when the emblem is moved toward the second position.

A method for securing an emblem and a horn switch to a cover of an airbag module in accordance with another exemplary embodiment is provided. The method includes placing the horn switch in a cavity of the cover. The method further includes securing the emblem over the horn switch by securing a bezel to the cover by passing a plurality of stakes of the bezel through the cover and heat staking the stakes to the cover. The emblem is capable of movement between first and second positions with respect to the bezel. The emblem causes activation of the horn switch when the emblem is moved toward the second position.

The above-described and other features of the present disclosure will be appreciated and understood by those skilled in the art from the following detailed description, drawings, and appended claims.

DETAILED DESCRIPTION OF THE INVENTION

Exemplary embodiments of the present invention are directed to an actuator for a horn of a vehicle, wherein the actuator is secured to a deployable portion of a cover of an airbag module. As used herein deployable portion is intended to refer to portions of the cover that separates from other portion of the cover during deployment of an airbag module located behind the cover. In addition and while these portions separate from each other during deployment they also remain secured to the cover at other sections to provide a deployable door or doors that allow an inflatable cushion of the airbag module to deploy therethrough. As used herein, cover is intended to refer a cover of a driver's side airbag module typically mounted in the center of a steering wheel. The deployable portion is an integral portion of the cover of the airbag module, wherein the entire deployable portion remains with one portion of the cover after it has separated due to the activation of an airbag module disposed behind the cover.

In accordance with an alternative exemplary embodiment of the present invention, the horn actuator is fixed to the cover and has: an emblem; a bezel fixedly secured to the deployable portion of the, the bezel movably securing the emblem to the cover such that the emblem is capable of movement between a first position and a second position with respect to the bezel, wherein the second position of the emblem causes activation of the horn. In an exemplary embodiment, a tether and/or a backing plate is secured to the bezel such that the bezel and the emblem remain secured to the deployable portion of the cover during deployment of an airbag module disposed behind the cover. In any of the aforementioned embodiments, a plurality of stakes of the bezel pass through openings in the cover and are secured to the tether or the backing plate or both.

In these non-limiting exemplary embodiments, the actuator includes an emblem with a circular, oval or other configurations and a decorative surface movably secured to a center or central portion of the cover of the airbag module. However, it is contemplated that the emblem can have various other shapes and be positioned on other suitable portions of the cover as styling dictates.

Referring now to FIGS. 1 through 10C, a cover 10 for an airbag module having an actuator 12 for a horn 11 (illustrated schematically in FIG. 1) of a vehicle is provided. The cover includes a decorative outer layer 14 having a predetermined tear seam 16. The cover further includes a bezel 18 fixedly secured to or in a recessed opening 19 of a deployable portion 20 of the decorative outer layer. The recessed opening is bounded by a side wall such that the entire bezel or a portion thereof when secured therein is received within the recessed opening. In one exemplary embodiment, the bezel has a rim portion with a surface that is flush with a surface of outer layer 14. Alternatively, the surface of the bezel slightly protrudes from the cover. It being understood that the deployable portion of the cover having the actuator secured thereto is integrally formed with one of at least two deployable doors or sections of the cover that are defined by tear seam 16, wherein the tear seam defines edges of the deployable doors of the cover. The predetermined tear seam will provide a weakened area of the cover that separates or provides doors during activation of the airbag module. In one non-limiting exemplary embodiment, the predetermined tear seam is a groove formed in an inner surface of the cover. Accordingly and in order to retain the actuator with one of the deployable doors, tear seam 16 will circumvent or travel around a portion of one of the deployable portions having the recessed area and the actuator secured thereto while another portion of the deployable portion is integrally formed with the one of the doors or sections defined by tear seam 16.

Figure 1:
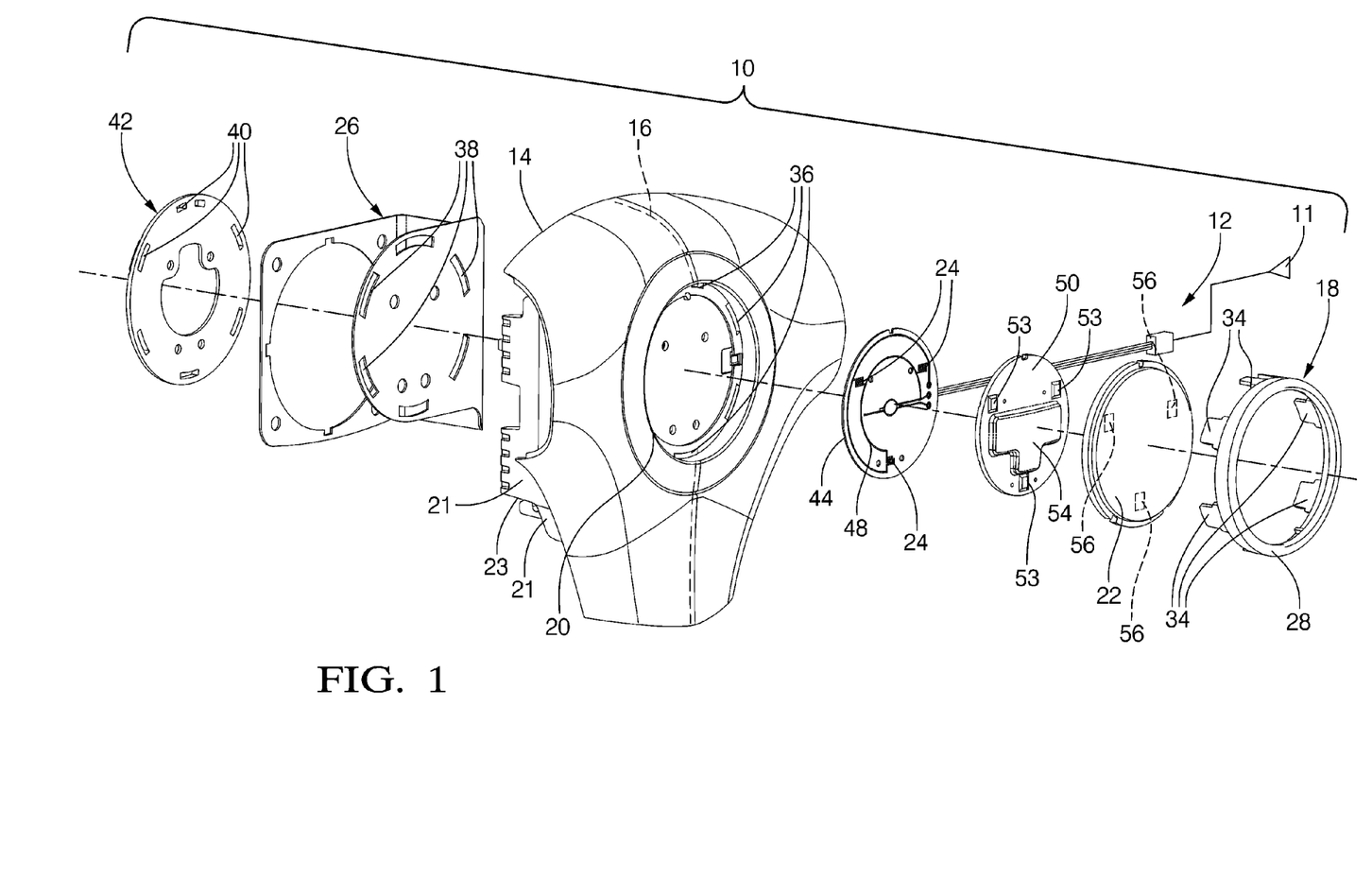
FIG. 1 is an exploded view of a cover for an airbag module having an actuator for a horn, in accordance with an exemplary embodiment of the present invention.
Figure 2:
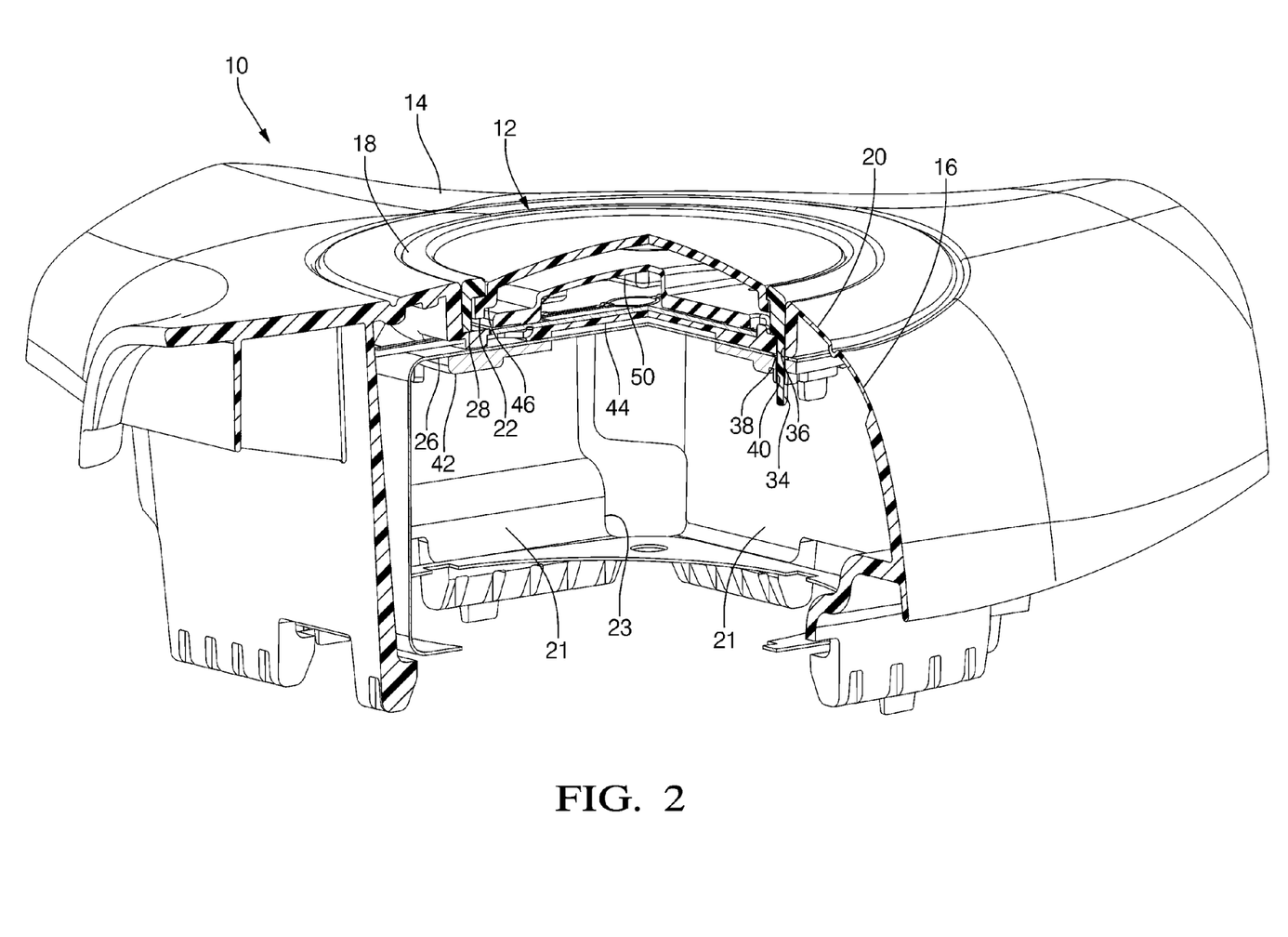
FIG. 2 is a partially cutaway view of the cover of FIG. 1 in an assembled position.

In accordance with an exemplary embodiment of the present invention the bezel movably secures an emblem 22 to the decorative outer layer, such that the emblem is capable of movement between first and second positions with respect to the bezel and other components of the actuator as will be discussed herein. For example, the rim portion of the bezel is configured such that the emblem will be able to move within the bezel however, an edge of the rim portion will engage an overturned edge of the emblem such that the emblem cannot pass through an opening defined by the rim portion. During this movement the emblem causes activation (e.g., closing) of one or more horn switches 24 or pairs of conductive traces 24 separated from each other on a non-conductive pad positioned on a flexible circuit as the emblem is moved from the first position to the second position. In one exemplary embodiment, the cover and actuator further includes a tether 26 secured to the bezel. The tether being configured to secure the bezel to another portion of the cover or a portion of an airbag module mounted to a steering wheel armature and located within and/or behind the cover. In one exemplary embodiment, the tether is secured to a backing plate or mounting plate of the airbag module. Accordingly, the tether prevents the bezel, the emblem and all of the components of the actuator from becoming dislodged when an inflatable cushion disposed behind the cover inflates and causes the cover to tear or break open along the tear seam and the deployable portions of the cover tear apart allowing an inflatable cushion of the airbag module to deploy therefrom.

In one exemplary embodiment, one end of the tether is secured to an armature of a steering by being disposed between a mounting plate of a driver's side airbag module and the armature. An example of a mounting plate is found in U.S. Pat. No. 7,159,897, the contents of which are incorporated herein by reference thereto. In this patent the mounting plate is identified by reference numeral 24. In this embodiment, the tether has a plurality of holes configured to allow attachment features (e.g., bolts or studs) of the mounting plate to pass therethrough. Here, the tether will have one portion secured to the backing plate and intermediary portion that travels around a folded airbag located inside the cover wherein the intermediary portion is positioned so that it will not interfere with the deployment of the inflatable cushion. For example, and in one non-limiting exemplary embodiment, the tether will comprise a backing plate mounting 15 portion, a securement portion 17 and a leg portion 19 interconnecting the backing plate mounting portion and the securement portion, the backing plate mounting portion having a plurality of openings configured to receive a portion of the plurality of stakes extending through the cover (See at least FIGS. 10A-10B). In addition and in accordance with an exemplary embodiment of the present invention the cover has at least a pair of internal side walls 21 (See at least FIGS. 1 and 2) and an opening 23 disposed between the pair of internal side walls, wherein the leg portion of the tether is passed through the opening. In accordance with an exemplary embodiment of the present invention the cover will have four or two pairs of side walls each having an opening therebetween for receipt of the leg portion of the tether therein.

FIGS. 10A-10B illustrate various configurations of contemplated tether designs for example in one embodiment, the tether comprises a single leg portion (FIGS. 10A and 10B) or in another embodiment, the tether comprises a pair of leg portions each having one end secured to the backing plate mounting portion while also having an individual securement portion such that the tether may comprise multiple securement points to fixed points of the steering wheel.

As discussed above the backing plate mounting portion of the tether is secured to the cover by or during the securement (e.g., welding, adhesives, combinations thereof or other securement process) of the stakes of the bezel to the deployable portion of the cover, which in one embodiment may be the securement of the backing plate to the stakes of the bezel through a welding or adhesive process.

Figure 3:
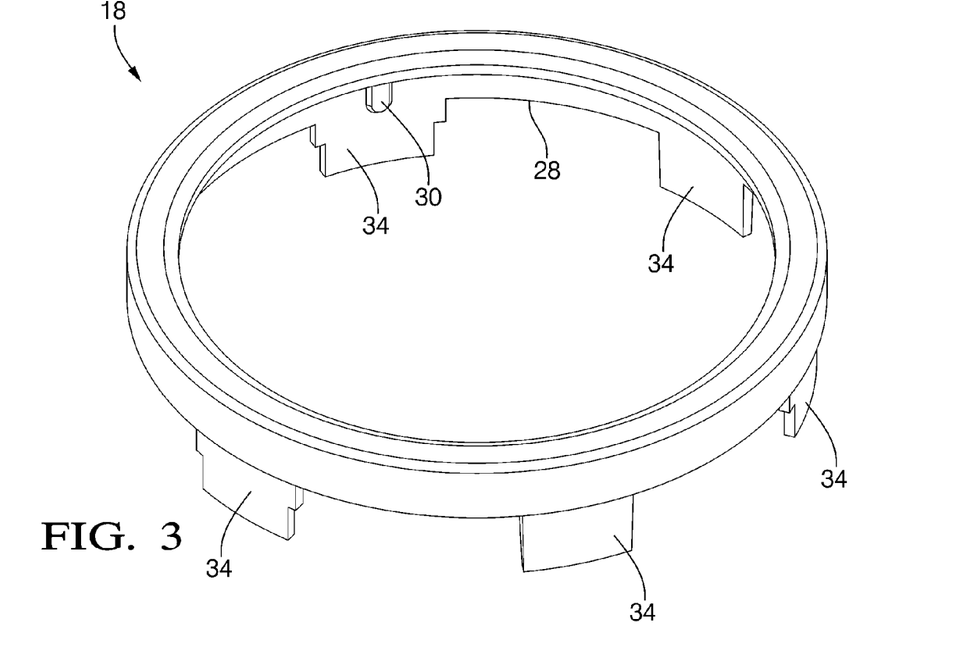
FIG. 3 is a perspective view of a bezel of the actuator of FIG. 1.
Figure 4:
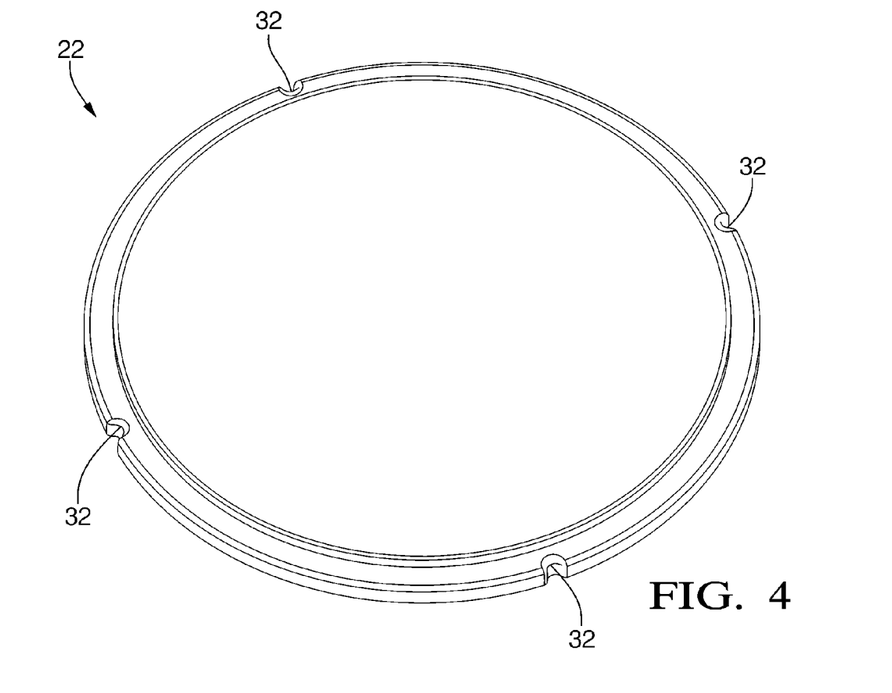
FIG. 4 is a perspective view of an emblem of the actuator of FIG. 1.

In accordance with an alternative exemplary embodiment of the present invention, the bezel includes a rim portion 28 having one or more raised surfaces 30 extending therefrom configured to slide within one or more notches 32 of the emblem, respectively. In one exemplary embodiment, the raised surfaces extend from an inner periphery of the rim portion of the bezel. Accordingly, the emblem is movable between the first and second positions without rotating with respect to the bezel (e.g., the raised surfaces slide within notches 32). In addition, the location of the raised surfaces and the notches align protrusions of the emblem with the switches of the horn circuit as well as provide a means for error proof assembly. In other words, the notches and protrusions prevent the emblem from being incorrectly installed within the bezel while also preventing rotational movement thereof when the emblem is moved within the bezel. It is contemplated that in an alternative embodiment, the raised surfaces can instead be configured (e.g., curved) to cause rotation of the emblem on the bezel or be omitted as desired.

The bezel further includes a plurality of stakes or heat staking members 34 extending from the rim portion. The stakes are configured to extend through a plurality of holes 36 in the recessed area of the deployable portion of the cover, a plurality of holes 38 of the tether and a plurality of holes 40 of a backing plate 42. The stakes are secured (e.g., welded, glued, etc.) to the backing plate, such that the bezel is fixedly secured to the tether and the cover, and the emblem is disposed in a cavity of the cover between the bezel and the cover here the bezel cannot move but the emblem can move between the bezel rim and a portion of the cover. In one non-limiting exemplary embodiment, the stakes are heat staked or welded to the backing plate and the tether by using a process similar to those illustrated in U.S. Pat. No. 5,762,365 the contents of which are incorporated herein by reference thereto. In one exemplary embodiment, the backing plate has a circular or other configuration that matches the configuration of the rim portion of the bezel with the exception that the backing plate periphery is larger than the periphery of the rim portion so that the stakes may be received within openings in the backing plate and be secured thereto, wherein the ends of the stakes are enlarged through the staking process such that they may no longer pass through the openings in the backing plate thus, securing the backing plate to the cover.

Accordingly, deployment of the airbag causes the predetermined tear seam of the cover to tear while the actuator remains attached to the deployable portion of the cover through the use of the backing plate and tether being secured to the stakes of the rim portion. In accordance with an exemplary embodiment of the present invention, the tear seam is positioned to traverse around a peripheral portion of the deployable portions while another portion of the deployable portions is integrally formed with the cover such that upon deployment of the airbag the cover will tear along the tear seam providing an opening for an inflatable cushion of the airbag module to deploy through while the deployable portions remain secured to one section of the cover located on one side of the tear seam.

Furthermore, the actuator remains secured to this deployable portion as the cover is tearing apart through the securement of the actuator to the deployable portion by the stakes of the bezel and the backing plate. In one non-limiting exemplary embodiment, the stakes and the backing plate are made of the same material in order to facilitate the welding of the stakes to the backing plate using for example, an ultrasonic welding process or heat staking of course, other equivalent process are contemplated.

As discussed herein, the tether is used to further secure the bezel to the deployable portion. Alternatively and if applicable, only the backing plate is secured to the bezel.

Figure 5:
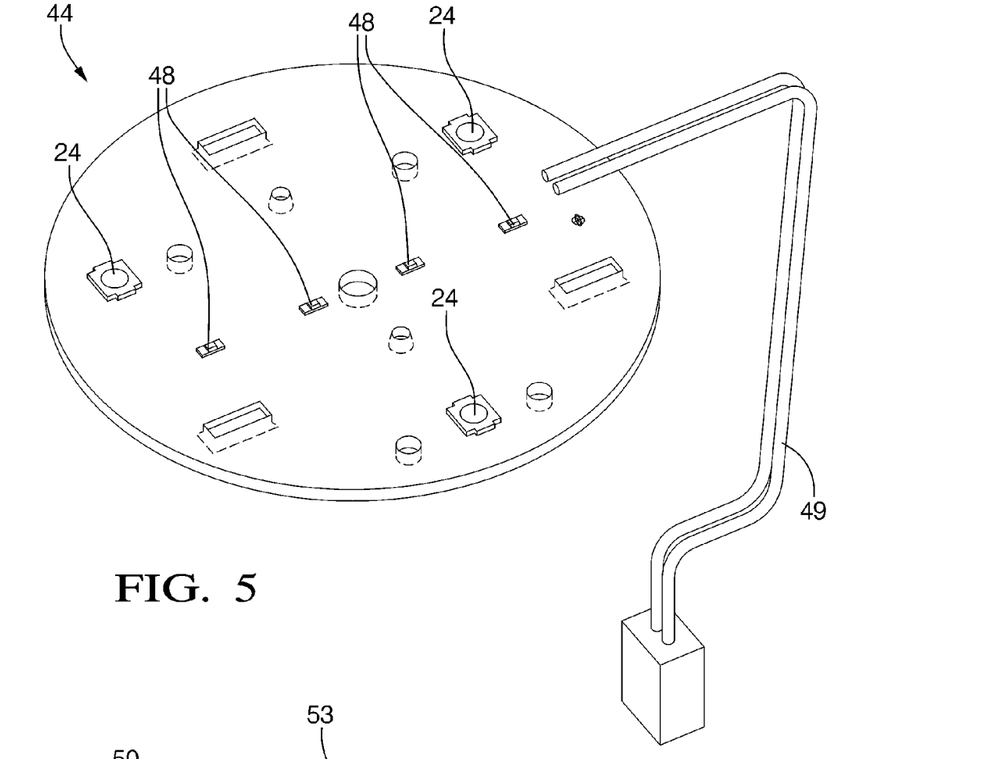
FIG. 5 is a perspective view of a printed circuit board of the actuator of FIG. 1.

The actuator further includes a circuit board 44 flexible or otherwise disposed between a lower surface 46 of the emblem and the deployable portion of the cover. As will be discussed herein, the lower surface of the emblem will have a plurality of protrusions extending therefrom to cause the switches of the circuit board to be closed in order to complete the horn activation circuit and enable the horn to activate as the switch is closed by movement of the emblem within the bezel. The circuit board is coupled to a circuit configured to activate the horn of the vehicle when the emblem is moved to the second position and closes at least one of three horn switches disposed on the circuit board. It is contemplated that the circuit board can have more or less than three horn switches as desired.

In one non-limiting exemplary embodiment, the circuit board will comprise a plurality of conductive traces 24 separated from each other on a non-conductive pad and wherein a conductive member of the biasing member is manipulated towards the conductive traces by movement of the emblem and contact of the conductive member or pad to the conductive traces causes the circuit to be complete thereby actuating the horn.

The circuit board in one alternative embodiment also includes a source of illumination 48. One non-limiting exemplary embodiment of a source of illumination 48 is a light emitting diode or a plurality of light emitting diodes. In this embodiment, the emblem and the biasing member are made of a translucent material, such that the source of illumination is visible through the emblem when the source of illumination is illuminated. Accordingly, the emblem may be back lighted when the vehicle lights are on or alternatively the emblem can light up when the horn is activated. A non-limiting example of the source of illumination is one or more light emitting diodes mounted to the circuit board. The circuit board further comprises a terminal 49 in electrical contact with the switches at one end and a horn and other required components (e.g., power supply etc.) at the other wherein closing of one of the contact switches will cause the horn to activate.

Figure 6:
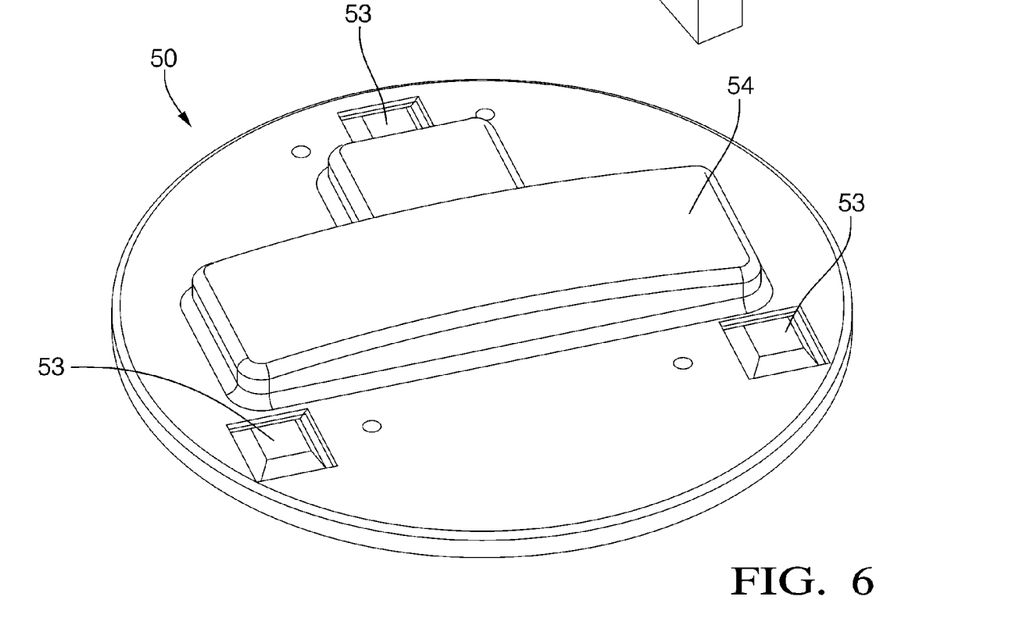
FIGS. 6 and 7 are top and bottom perspective views of an elastomer key pad of the actuator of FIG. 1.
Figure 7:
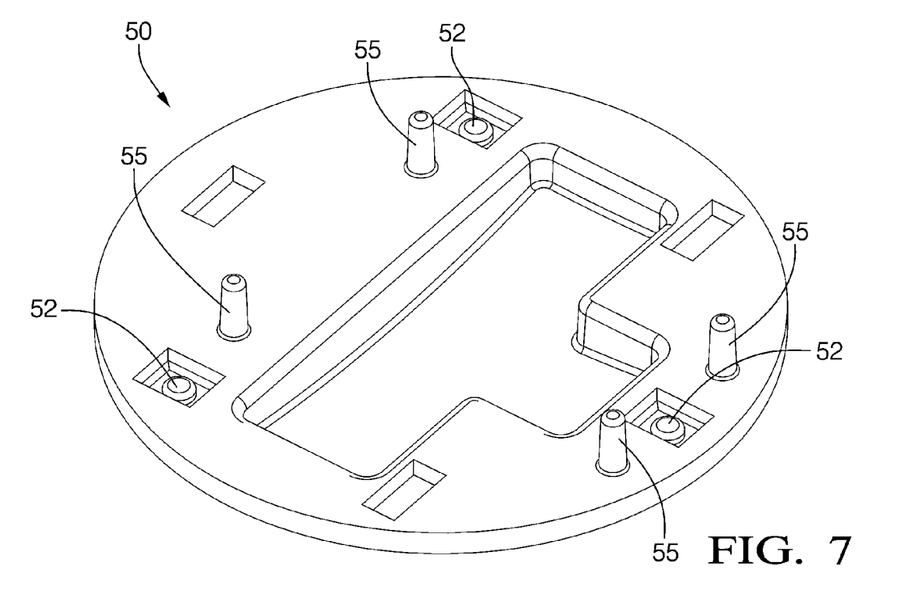

The actuator further includes a biasing member 50 or members or springs configured to bias the emblem toward the first position. In one exemplary embodiment, the biasing member is made of an elastomer layer disposed in the cavity between the circuit board and the lower surface of the emblem. The elastomer layer in one non-limiting embodiment has three conductive contact pads 52 configured to close at least one of the three horn switches (e.g., conductive traces disposed on a non-conductive pad) when the emblem is moved from the first position toward the second position thus closing the circuit and actuating the horn. In one embodiment, the pads have a conductive contact surface configured to engage a respective pair of separated conductive traces and act as a switch and close the circuit (e.g., bridge the gap between the conductive traces) when it is manipulated toward the conductive traces. In addition, the conductive pads extend from and are attached to a flexible protrusion 53 that extends away from the switch and provides the biasing force to a complimentary protrusion extending from the emblem. In one non-limiting exemplary embodiment, the conductive contact pads are positioned on a feature that extends from the flexible protrusion. It is further contemplated that the elastomer layer can have more or less than three contact pads for closing the horn switches.

In yet another alternative embodiment, the conductive traces on the circuit board are replaced with a micro-switch or other equivalent device that is closed when the emblem is moved toward the circuit and opened when the emblem is biased back away from the circuit by the biasing member.

In addition and in one non-limiting exemplary embodiment, the biasing member has a plurality of locating features 55 for receipt in corresponding openings in the flexible circuit board. The locating features will ensure that contact pads of the elastomer layer are positioned over the conductive paths or switches of the circuit board.

In accordance with an exemplary embodiment of the present invention, the emblem further comprises a plurality of protrusions 56 that extend from an inner surface of the emblem the protrusions are configured to engage the flexible biasing protrusion of the elastomer layer in order to close the circuit by applying the conductive pads to the conductive paths of closing the switches as the emblem is moved from the first position to the second position thus depressing the biasing protrusions and the contact pads towards a pair of isolated contact paths of the circuit board.

The protrusions extend from an inner surface of the emblem and in one embodiment are aligned with the flexible protrusion 53 and contact pads 52, and the switches via the notches 32 and protrusions 30 illustrated in FIGS. 3 and 4. In addition and in one embodiment, the elastomer layer further comprises protruding area 54 that provides an area that covers the illuminating members (e.g., leds) and other circuit components of the circuit board. In this embodiment, the elastomer layer will be translucent so that the light of the illuminating members passes through the elastomer layer and backlights the emblem.

In accordance with an exemplary embodiment of the present invention, the flexible protrusions 53 of the elastomer layer provide a biasing force to the emblem via the protrusions to bias the emblem back into the first position. In addition, the contact pads and/or the protruding area provide a shock absorbing feature during deployment of the airbag module wherein contact of the emblem against a hard surface (e.g., steering wheel rim) will prevent the shattering of the emblem.

In one non-limiting exemplary embodiment, the elastomer layer is formed from a silicone material that is not temperature dependent for providing the desired biasing force or spring rate to the emblem.

Figure 8:
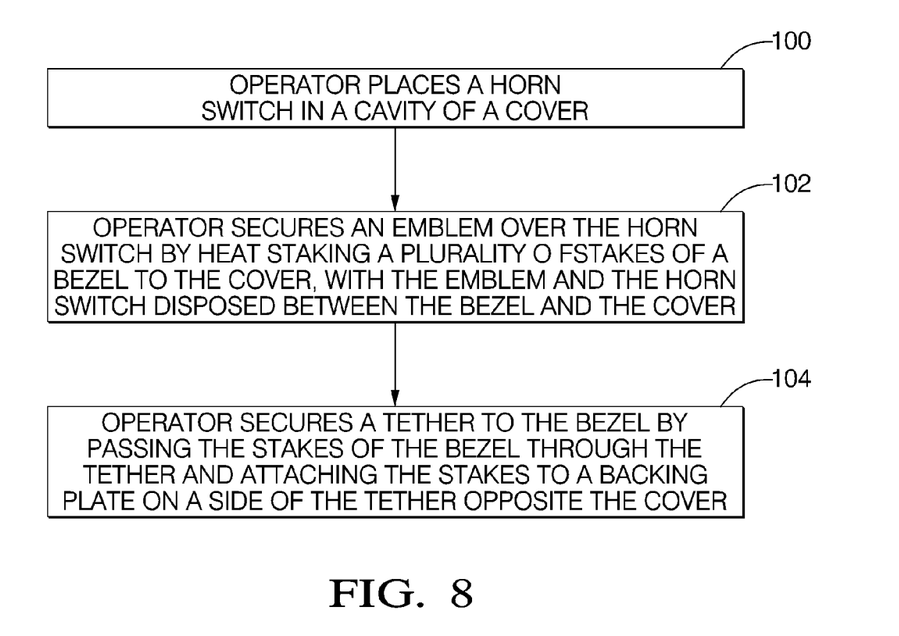
FIG. 8 is a flow chart of a method of securing an emblem and a horn switch to a cover of an airbag module, in accordance with an exemplary embodiment.
Figure 9:
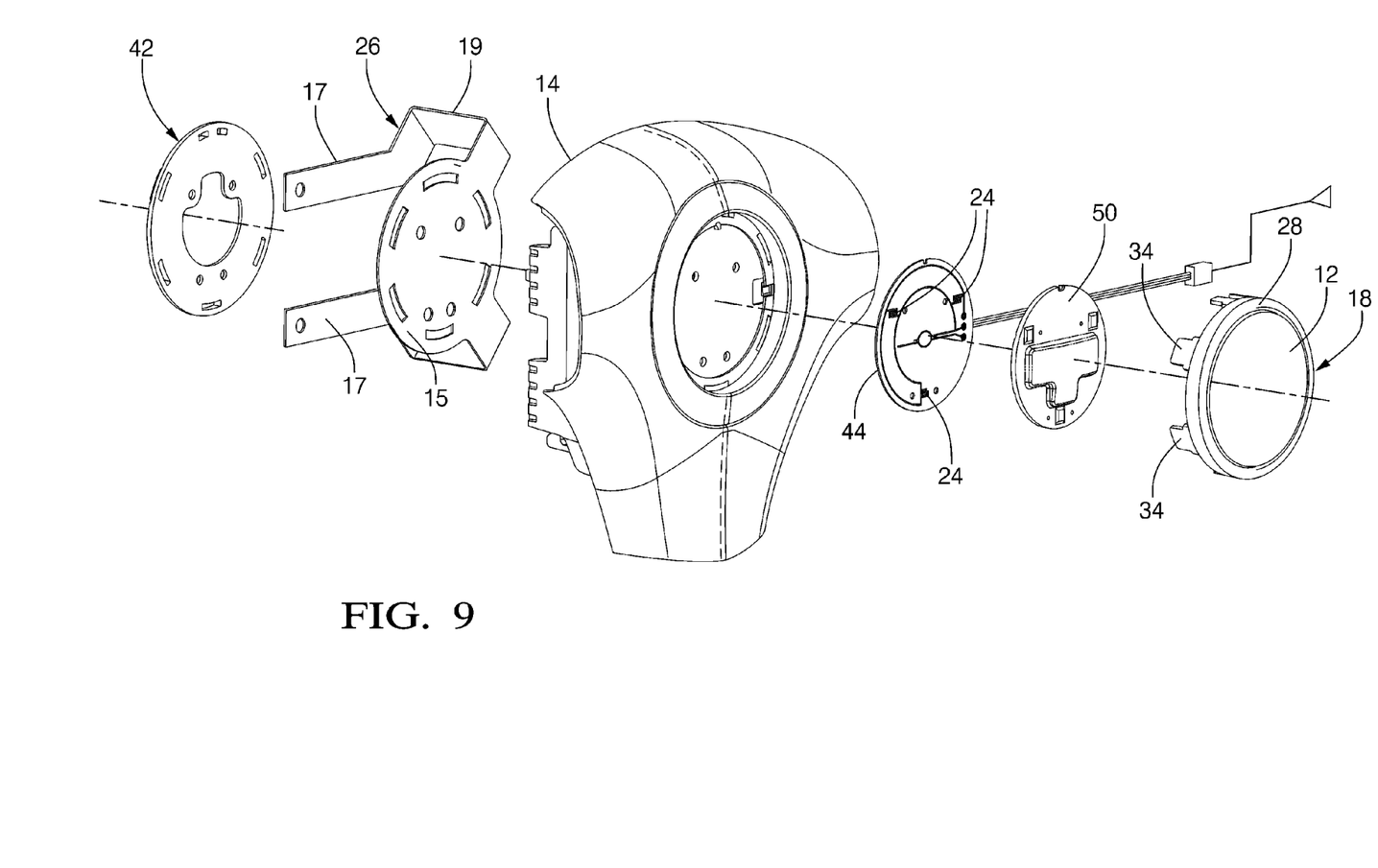
FIG. 9 is an exploded view of an alternative exemplary embodiment of the present invention.
Figure 10:
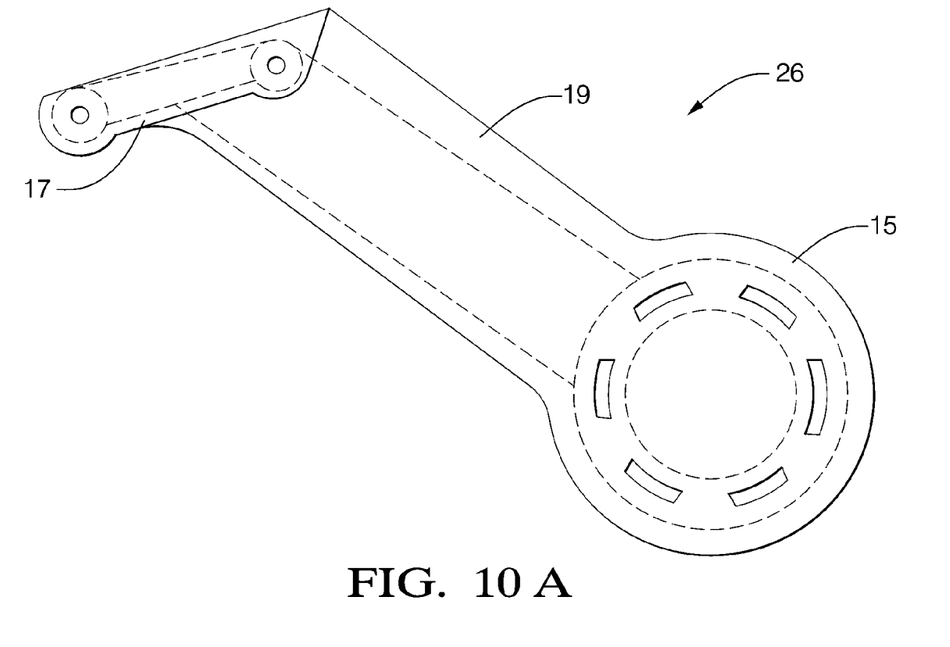
FIGS. 10A-10C are views of tethers contemplated for alternative exemplary embodiments of the present invention.

Referring now to FIG. 8, a flowchart of a method for securing an emblem and a horn switch to a cover of an airbag module is provided.

At step 100, a circuit board or horn switch is placed in a cavity or recess of a cover of an airbag module. The circuit board has at least one switch for closing a circuit of horn in order to activate the horn.

Next at step 102, an emblem and biasing member are placed over the horn switch and secured to a deployable portion of the cover by securing a bezel to the cover. The bezel has a rim portion for retaining the emblem between the circuit board and the rim portion. The bezel is secured to the deployable portion by passing a plurality of stakes of the bezel through complimentary openings in the cover and a backing plate disposed behind the deployable portion of the cover. Then a portion of the plurality of stakes are heat staked to the backing plate securing the bezel, the backing plate, the emblem and the horn switch to the deployable portion of the cover. In an alternative exemplary embodiment, a tether is provided wherein the tether is also secured to the cover or backing plate. In this embodiment, the tether also comprises a plurality of openings for receipt of a portion of the stakes therein after they have passed through the cover. This is represented by step 104, which as discussed above is contemplated as an alternative exemplary embodiment of the present invention.

Since the emblem and the horn switch are disposed between the bezel and the cover and the emblem is capable of movement between first and second positions, the horn switch is activated when the emblem is moved toward the second position. Further, the emblem is biased to the first position by a biasing member positioned between the emblem and the horn switch.

Non-limiting exemplary materials for the bezel and the backing plate are those that can withstand impacts at high temperatures and low temperatures examples include polycarbonate (PC), acrylonitrile butadiene styrene (ABS), polypropylene, PCABS blend and equivalents of any of the foregoing and non-limiting exemplary materials for the emblem include but are not limited to metal (e.g., stamping, die casting, etc.) or polycarbonate, clear polycarbonate for back lighting, ABS, polypropylene, PCABS blend and equivalents thereof.

In one non-limiting exemplary embodiment, the material used for the bezel and the backing plate are the same in order to facilitate the welding or securement of the two materials together. In one exemplary embodiment the material for the bezel and the backing will be a polycarbonate. In yet another exemplary embodiment, the material for the bezel and the backing will be a silicone modified polycarbonate. Furthermore and in accordance with an exemplary embodiment of the present invention the bezel and the backing plate are formed from a material that has a high elongation at low temperatures one non-limiting example of such a material is currently available under the trademark or trade name LEXAN or LEXAN EXL available from SABIC. This material can withstand high impacts and has ductility at low temperatures as compared to standard PC grades.

In one exemplary embodiment, the material for the bezel and the backing plate has approximately 18% elongation at −35 degrees Celsius. In accordance with an exemplary embodiment of the present invention the materials for the backing plate, tether and bezel much pass deployment criteria wherein the actuator will remain attached to the cover during deployment.

For example, one non-limiting exemplary embodiment contemplates a silicone modified polycarbonate (e.g., a material such as LEXAN EXL or equivalents thereof) for the bezel and the backing plate, a polycarbonate or a PCABS for the emblem, an elastomer made of silicone for the biasing member and nylon for the tether.

If necessary, the materials contemplated for the tether are similar to those for an inflatable cushion (e.g., nylon or equivalents thereof).

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An actuator for a horn of a vehicle, comprising:
    an emblem;
    a bezel fixedly secured to a first side of a deployable portion of a cover of an airbag module, the bezel movably securing the emblem to the cover and the emblem being capable of movement between a first position and a second position with respect to the bezel, the second position causing activation of the horn;
    a backing plate secured to the bezel at a second side opposite the first side of the deployable portion; and
    a tether secured to the bezel, the tether retaining the actuator with the cover after deployment of the airbag module.

2. The actuator as in claim 1, wherein the bezel is received within a cavity formed in the deployable portion of the cover.

3. The actuator as in claim 2, wherein the bezel has a rim portion having a first surface and a second surface and a plurality of stakes extending from the second surface, the plurality of stakes passing through complementary openings in the cavity and the first surface is flush with an exterior surface of the first side of the cover when the bezel is received within the cavity, the plurality of stakes being secured to the backing plate.

4. The actuator as in claim 3, wherein the plurality of stakes and the backing plate are formed from the same material and the backing plate is heat staked to the portion of plurality of stakes extending through the openings in the cavity.

5. The actuator as in claim 1, further comprising:
    a biasing member for biasing the emblem into the first position, the biasing member being disposed between the emblem and the deployable portion of the cover; and
    the bezel has a rim portion having a first surface and a second surface and a plurality of stakes extending from the second surface, the plurality of stakes passing through complementary openings in the cavity and the first surface is flush with an exterior surface of the first side of the cover when the bezel is received within the cavity the plurality of stakes being secured to the backing plate.

6. The actuator as in claim 5, wherein the biasing member comprises a flexible elastomer having a plurality of protrusions with conductive contact points that protrude away from a surface of the biasing member and each of the conductive contact points are positioned over a pair of conductive traces separated from each other on a non-conductive portion of a circuit board positioned between the biasing member and the deployable portion of the cover, wherein manipulation of the emblem will either open or close a horn activation circuit by moving the conductive contact points of the biasing member.

7. The actuator as in claim 6, wherein the emblem further comprises a plurality of protrusions positioned to contact the plurality of protrusions, wherein the plurality of protrusions bias the emblem into the first position.

8. The actuator as in claim 7, wherein the rim portion is circular, the emblem is circular and the emblem is translucent and the circuit board further comprises a light source that is visible through the emblem.

9. The actuator as in claim 1, wherein the bezel has a rim portion with a plurality of stakes extending from the rim portion, the plurality of stakes passing through complementary openings in the cover and the backing plate when the bezel is secured to the cover and the tether further comprises a backing plate mounting portion, a securement portion and a leg portion interconnecting the backing plate mounting portion and the securement portion, the backing plate mounting portion having a plurality of openings configured to receive a portion of the plurality of stakes extending through the cover.

10. The actuator as in claim 9, wherein the cover has at least a pair of internal side walls and an opening disposed between the pair of internal side walls, wherein the leg portion of the tether is passed through the opening.

11. The actuator as in claim 1, further comprising:
a circuit board located between a lower surface of the emblem and the deployable portion of the cover, the circuit board having at least one switch that is closed when the emblem is moved toward the second position;
a biasing member for biasing the emblem into the first position, wherein the bezel has a rim portion having a first surface and a second surface and a plurality of stakes extending from the second surface, the plurality of stakes passing through complementary openings in the cavity and the first surface is flush with an exterior surface of the first side of the cover when the bezel is received within the cavity the plurality of stakes being secured to the backing plate and the rim further comprises a plurality of raised surfaces for receipt within complimentary notches in a periphery of the emblem, the raised surfaces and the notches prevent rotation of the emblem as it is moved between the first position and the second position.

12. The actuator as in claim 11, wherein the biasing member is an elastomer layer disposed between the circuit board and the lower surface of the emblem and the biasing member has a plurality of protrusions for providing a biasing force to the emblem.

13. The actuator as in claim 1, wherein the tether further comprises a backing plate mounting portion, a securement portion and a leg portion interconnecting the backing plate mounting portion and the securement portion.

14. The actuator as in claim 13, wherein the bezel has a rim portion with a plurality of stakes extending therefrom, the plurality of stakes extending through the deployable portion of the cover and the backing plate and the bezel are formed from the same material and the rim further comprises a plurality of raised surfaces for receipt within complimentary notches in a periphery of the emblem, the raised surfaces and the notches prevent rotation of the emblem as it is moved between the first position and the second position.

15. The actuator as in claim 1, further comprising:
a circuit board located between a lower surface of the emblem and the deployable portion of the cover, the circuit board having a source of illumination and a switch that is closed when the emblem is moved toward the second position and wherein the emblem is translucent such that the source of illumination when illuminated is visible through the emblem.

16. The actuator as in claim 15, wherein the source of illumination is at least one light emitting diode mounted to the circuit board and the actuator further comprises a biasing member for biasing the emblem into the first position.

17. A cover for an airbag module mounted to a steering wheel, the cover comprising:
a decorative outer layer having a predetermined tear seam; and
a bezel fixedly secured to a first side of a deployable portion of the decorative outer layer, the bezel movably securing an emblem to the decorative outer layer and the emblem being capable of movement between a first position and a second position with respect to the bezel, the second position causing activation of a horn switch;
a backing plate secured to the bezel at a second side opposite to the first side of the deployable portion; and
a tether secured to the bezel, the tether retaining the actuator with the cover after deployment of the airbag module.

18. The cover as in claim 17, further comprising:
a biasing member for biasing the emblem into the first position; and the bezel has a rim portion with a plurality of stakes extending therefrom, the plurality of stakes extending through the deployable portion of the cover and the backing plate, the plurality of stakes and the backing plate are formed from the same material.

19. The cover as in claim 17, further comprising:
a printed circuit board located between a lower surface of the emblem and the cover, the printed circuit board having the horn switch secured thereto; and
a biasing member for biasing the emblem into the first position; the bezel having a rim portion with a plurality of stakes extending therefrom, the plurality of stakes extending through the deployable portion of the cover and the backing plate, the rim further comprising a plurality of raised surfaces for receipt within complimentary notches in a periphery of the emblem, the raised surfaces and the notches prevent rotation of the emblem as it is moved between the first position and the second position.

20. The cover as in claim 17, further comprising:
a circuit board located between a lower surface of the emblem and the decorative outer layer of the cover, the circuit board having the horn switch and a source of illumination mounted thereto and wherein the emblem is translucent such that the source of illumination when illuminated is visible through the emblem and the source of illumination is at least one light emitting diode mounted to the circuit board and the actuator further comprises a biasing member for biasing the emblem into the first position.

21. A method for securing an emblem and a horn switch to a cover of an airbag module, the method comprising:

placing a horn switch in a cavity of the cover;

securing an emblem over the horn switch by securing a bezel to the cover by passing a plurality of stakes of the bezel through the cover and heat staking the stakes to a backing plate and a tether located on an opposite side of the cover, the emblem being capable of movement between a first position and a second position with respect to the bezel, the second position causing activation of the horn switch; and biasing the emblem into the first position.

* * * * *